United States Patent Office 2,922,408
Patented Jan. 26, 1960

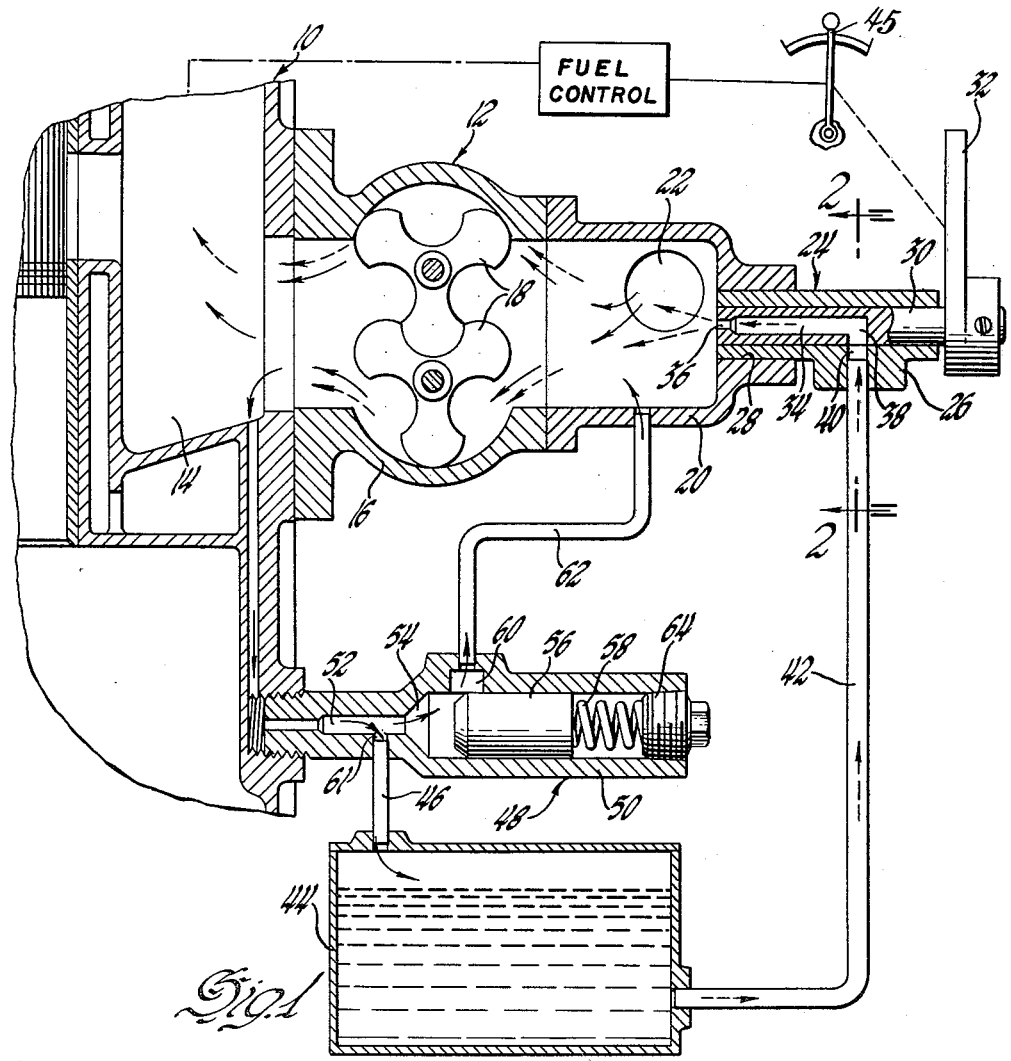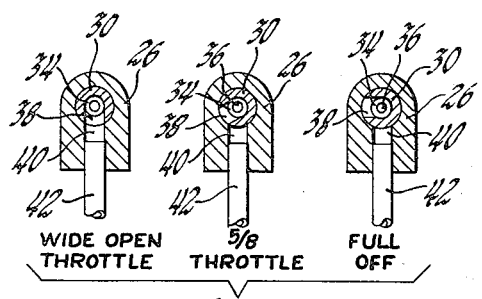

2,922,408

TOXIC EXHAUST GAS PREVENTING DEVICE FOR AN INTERNAL COMBUSTION ENGINE

Harvey G. Humphries, Detroit, and John Dickson, Bloomfield Hills, Mich., assignors to General Motors Corporation, Detroit, Mich., a corporation of Delaware Application November 7, 1958, Serial No. 772,513

7 Claims. (Cl. 123—25)

The present invention relates to a device for reducing the formation of toxic gases frequently found in the exhaust gases of an internal combustion engine. The most toxic of these exhaust gases are those formed from the oxides of nitrogen.

The present invention provides a device whereby water is added to the combustion air under certain engine speed and load conditions in such a way as to reduce the formation of oxides of nitrogen to a level compatible with the presence of human beings required to work in the presence of such engines in confined areas.

It is common practice for Federal and State authorities to require that before an internal combustion engine can be approved for underground use, tests must be made to determine the quantities of harmful constituents present in the exhaust gases. By use of approved formulae the quantity of ventilating air required to dilute the toxic gases is calculated to insure hygienic safety to the operating personnel in the underground or confined application of these engines. The present invention in providing means for injecting water into the combustion air is able to significantly reduce the formation of oxides of nitrogen during the combustion process.

Inasmuch as the formation of oxides of nitrogen varies with engine load and speed, it is proposed in the subject device to regulate the admission of water to those loads and speeds where the formation of oxides of nitrogen is a factor in determining the quantity of ventilating air required.

For purposes of illustrating the present invention, an internal combustion engine of the diesel type has been modified to include the invention. It is to be understood, of course, that the device may be suitably modified for use with other types of internal combustion engines.

The details as well as other objects and advantages of the present invention will be apparent from a perusal of the detailed description which follows.

In the drawings:

Figure 1 is a diagrammatic representation of the subject invention as combined with a diesel type engine; and Figure 2 illustrates the water controlling valve in various positions.

An internal combustion engine of the diesel type is shown generally at 10. The diesel engine, per se, constitutes no part of the present invention save insofar as it is combined with the device for injecting water into the combustion air, therefore, the details of the engine are not shown. For the purposes of the present invention it will suffice to note that an engine blower is shown generally at 12 and the output side of which communicates with the air box 14 of the diesel engine. Since the diesel engine is a two-cycle engine, air must be supplied to the engine under pressure which is the purpose of blower 12.

Blower 12 includes a first casing member 16 within which rotors 18 are rotatably supported and a second or air inlet casing 20. Air inlet casing 20 includes an inlet 22 through which air is drawn to be compressed by rotors 18 and supplied to engine air box 14.

A valve device indicated generally at 24 is also mounted in air inlet casing 20. Device 24 includes a valve casing member 26 disposed within an opening 28 formed in casing 20. A sleeve 30 is rotatably disposed within valve casing 26. A lever 32 is fixed to the outer end of sleeve 30 thereof exteriorly of casing 26. A longitudinal passage 34 is formed through sleeve 30 and opens at one end through an orifice 36 to communicate with the interior of air inlet casing 20. The other end of passage 34 communicates with a radial port 38 which, under certain operating conditions, is adapted to register with a passage 40 in casing 26. Casing passage 40 communicates through a conduit 42 with a water tank 44.

Lever 32 fixed to valve sleeve 30 is adapted to be suitably articulated to a throttle or governor mechanism in order that the position of sleeve 30 is determined by engine demand. For illustrative purposes lever 32 is diagrammatically shown as being articulated to a throttle control member 45 which is also adapted to regulate a fuel control device. The operation of lever 32 will subsequently be considered in greater detail.

Water tank 44 is communicated above the normal fuel level therein with engine air box 14 through a conduit 46 and an air pressure control valve 48. Accordingly, inasmuch as air box 14 is under superatmospheric pressure it is apparent that the air space above the water in tank 44 will likewise be under superatmospheric pressure.

Before describing the subject device further, it will be appropriate to again note that oxides of nitrogen are formed in an internal combustion engine in significant quantities during certain engine speed and load conditions. When these conditions are not reached or exceeded, it is unnecessary to provide water to the combustion air to prevent the formation of these oxides of nitrogen. Accordingly, and as illustrated in Figure 2, it will be seen that when the throttle or governor controlled lever is in a full off position that radial port 38 of sleeve 30 will be completely out of registry with water supply passage 40. In general, this condition will obtain up to the point of approximately 5/8 open throttle, which figure is used only for illustrative purposes. From the 5/8 open position on as throttle lever 32 is moved to increase engine speed or power, radial sleeve port 38 will begin to register with passage 40. Water under pressure will thus be admitted through longitudinal passage 34 to air inlet casing 20 where it will mix with the combustion air supplied to engine air box 14.

In this manner the ratio of water to air supplied to the engine under those conditions when the formation of oxides of nitrogen is critical is kept substantially constant.

Air pressure control valve 48 includes a hollow casing 50 communicating through a passage 52 with air box 14. Air passage 52 communicates at its other end with an enlarged passage 54 formed in casing 50 and within which latter passage a plunger 56 is slidably disposed. Plunger 56 is normally biased by a spring 58 in a direction tending to restrict the flow of air through an exhaust passage 60. Exhaust passage 60 communicates with air inlet casing 20 through a conduit 62. Passage 52 communicates intermediate its end with a radial passage 61 which connects with conduit 46. Thus by regulating the force of spring 58 through an adjustable plug 64 threadably disposed in casing 50, the pressure of air within water tank 44 may be controlled.

Air pressure control valve 48 is provided for the purpose of permitting latitude in the location of water tank 44 with respect to water controlling valve 24. In other words, based on the height or head between water tank 44 and valve 24 the pressure required to lift the water from the tank to the valve will be varied. The greater the height or head the greater the pressure required within tank 44 to deliver the water to valve 24. The pressure increase is realized by threading plug 64 within casing 50 to increase the force of spring 58.

It is apparent that various structural modifications may be made in the subject device within the scope of the invention as set forth in the hereinafter appended claims.

We claim:

1. An internal combustion engine including an air reservoir, a blower for delivering air under pressure to said reservoir, a water tank, first conduit means connecting said water tank with said air reservoir for pressurizing said water tank, valve means associated with the inlet side of said blower, second conduit means communicating said water tank with said valve means, said valve means including an adjustable member for supplying water to said blower in accordance with engine demand, and a valve device disposed in the conduit connecting said reservoir and said water tank for controlling the air pressure within said water tank.

2. An internal combustion engine as set forth in claim 1 in which the valve means comprises a casing having a longitudinal opening therethrough communicating at one end of the inlet side of said blower, a passage in said casing communicating the opening with the second conduit means, a sleeve member rotatably disposed within the casing opening, a longitudinal passage in said sleeve, one end of said longitudinal passage communicating through an orifice with the blower inlet, the other end of said longitudinal passage being adapted to variably register with the casing passage to control the quantity of water supplied in accordance with engine demand.

3. An internal combustion engine as set forth in claim 2 in which said sleeve includes a portion extending outwardly of said casing, a lever fixed to said sleeve portion to rotate the sleeve and varying the quantity of water flowing through the valve means in accordance with engine demand.

4. An internal combustion engine as set forth in claim 3 in which the casing passage is radially disposed relative to said opening, said sleeve passage terminating in a radial port longitudinally aligned with said radial casing passage, the registry of said port and radial passage being variable in accordance with the position of said lever.

5. An internal combustion engine including an air reservoir, a blower for delivering air under pressure to said reservoir, a water tank, first conduit means connecting said water tank with said air reservoir for pressurizing said water tank, valve means associated with the inlet side of said blower, second conduit means communicating said water tank with said valve means, said valve means including an adjustable member for supplying water to said blower in accordance with engine demand, a valve device disposed in the conduit connecting said reservoir and said water tank for controlling the air pressure within said water tank, said device including an exhaust port, a conduit communicating the exhaust port with the inlet side of said blower, a slidable valve element and a spring element biasing the slidable valve element to close said exhaust port against the force of said air pressure.

6. An internal combustion engine including an air reservoir, a blower for delivering air under pressure to said reservoir, a water tank, first conduit means connecting said water tank with said air reservoir for pressurizing said water tank, valve means associated with the inlet side of said blower, second conduit means communicating said water tank with said valve means, said valve means including an adjustable member for supplying water to said blower in accordance with engine demand, and a valve device disposed in the conduit connecting said reservoir and said water tank for controlling the air pressure within said water tank, said device including an exhaust port, a conduit communicating the exhaust port with the inlet side of said blower, a slidable valve element and a spring element biasing the slidable valve element to close said exhaust port against the force of said air pressure, and means for adjusting the force of the spring element to vary the air pressure within the water tank.

7. An internal combustion engine including an air reservoir, a blower for delivering air under pressure to said reservoir, a water tank, first conduit means connecting said water tank with said air reservoir for pressurizing said water tank, valve means associated with the inlet side of said blower, second conduit means communicating said water tank with said valve means, said valve means comprising a casing having a longitudinal opening therethrough communicating at one end of the inlet side of said blower, a passage in said casing communicating the opening with the second conduit means, a sleeve member rotatably disposed within the casing opening, a longitudinal passage in said sleeve, one end of said longitudinal passage communicating through an orifice with the blower inlet, the other end of said longitudinal passage being adapted to variably register with the casing passage to control the quantity of water supplied in accordance with engine demand, and a valve device disposed in the conduit connecting said reservoir and said water tank for controlling the air pressure within said water tank, said device including an exhaust port, a conduit communicating the exhaust port with the inlet side of said blower, a slidable valve element and a spring element biasing the slidable valve element to close said exhaust port against the force of said air pressure.

References Cited in the file of this patent

UNITED STATES PATENTS 2,518,858    Bennett et al. _____ Aug. 15, 1950